Patented Aug. 5, 1947

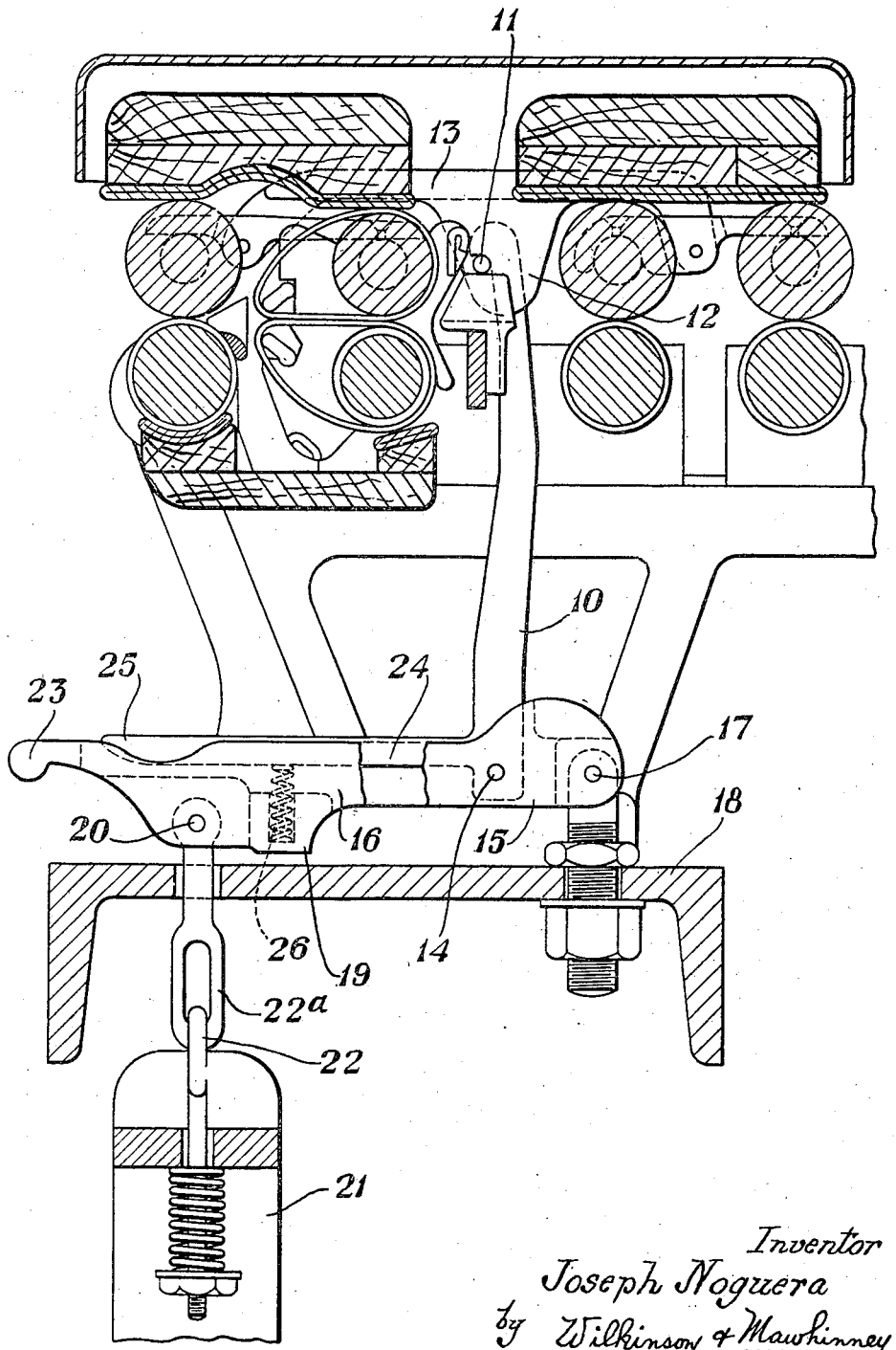

2,425,264

UNITED STATES PATENT OFFICE 2,425,264

WEIGHTING MOTIONS FOR THE DRAFTING ROLLERS OF PREPARATORY AND SPINNING MACHINES

Joseph Noguera, Manchester, England, assignor to Casablancas High Draft Company Limited, Manchester, England, a British company Application September 28, 1945, Serial No. 619,068
In Great Britain October 3, 1944

4 Claims. (Cl. 19—135)

This invention relates to weighting motions for the drafting rollers used in preparatory and spinning machines, such as drawing frames, speed frames, ring frames, and mules, such motions being of the kind in which pressure is exerted on the top rollers by a hook connected with a weight through the medium of a multiplying lever. The hook may exert the pressure on the rollers through a saddle, or set of saddles acting in unison.

According to the invention, in weighting motions of the kind described, means are provided for attaching or, alternatively, detaching the hook on to or from the top roller (or the saddle if this is used), said means being capable of being actuated from the front of the machine so that it is unnecessary to handle the hook itself.

The arrangement is such that said means are under the control of the operator, and the release of pressure by manipulation of the multiplying lever is effective automatically to actuate said means.

According to one embodiment, said means tending to attach or detach the hook consists of an actuating lever integral with or rigidly connected to the hook rod, which actuating lever can be lifted or depressed by the thumb of the operator in such a way as to attach or detach the hook to or from the roller or saddle in a simple manner. Spring means may be provided to bear between the actuating and multiplying levers in such manner that when the free end of the multiplying lever is lifted, the action of the spring on the actuating lever detaches the hook.

The invention will now be described with reference to the accompanying drawing, which shows one embodiment of the invention by way of example only.

The weighting hook 10 is adapted to engage a transverse pin 11 secured between lugs 12 on the saddle 13. At its lower end, the hook 10 is pivotally connected by means of a transverse pin 14 between lugs 15 on the multiplying lever 16 which is hollow and substantially of U-section and is pivotally mounted at 17 on the roller beam 18. The multiplying lever 16 is formed with an abutment 19 between its pivoted end and the transverse pin 20 which supports the weight 21 by way of the hook 22 and link 22a, said abutment being adapted to rest on the roller beam 18. It will be seen that the multiplying lever 16 is mounted so that its end farthest from the fulcrum comes nearest the front of the machine and is formed with a curved extension 23 to facilitate the lifting of the weight. An actuating lever 24 is rigidly connected to the hook 10 and is housed within the multiplying lever 16, the end 25 of the actuating lever being available at the front of the machine for manipulating the lever 24. Said lever 24 can be lifted or depressed by the thumb of the operator in such a way as to attach or detach the hook on to or from the saddle in a simple manner. Means may be provided, however, to ensure that the hook is detached from the saddle when the multiplying lever is lifted, said means consisting of a coil spring 26 housed in the lever 16, one end of the spring bearing upon the abutment 19 and the other end of the spring engaging the actuating lever 24.

It will be seen that when the operator lifts the free end of the multiplying lever 16, the hook is immediately detached from the saddle by the action of the spring 26 upon the actuating lever 24, and the abutment 19 can then be brought to rest on the roller beam. The top rollers are thus released from pressure and can be removed if desired.

In order to re-apply the pressure, the multiplying lever is lifted and the actuating lever pressed down, so that the hook is re-engaged.

If desired, the spring may tend to maintain the connection of the hook with the saddle and means be provided for releasing the hook. Alternatively, the shape of the hook may be such as to counterweight it, tending to attach or detach it as may be desired. If the aforesaid spring be omitted, the weight of the actuating lever itself may tend to attach the hook, in which case both levers could be lifted to detach the hook.

By the use of this invention the advantages are obtained that both in applying and releasing the pressure only the front parts of the two levers need be touched and these are in a very accessible position. The space between the drafting rollers and the roller beam is kept free from encumbrances so that undercleaners can be installed and can be put in and taken out without difficulty. A sufficiently heavy pressure can be simultaneously applied to all the top rollers with a relatively small actual weight, and only a small effort is necessary for attaching and detaching the hook.

What I claim and desire to secure by Letters Patent of the United States is:

1. Weighting motions for drafting rollers used in preparatory and spinning machines comprising a hook member, means associated with said rollers for engaging said hook member, a multiplying lever pivotally supported at one end and with its free end accessible in the front of the machine, weighting means attached to said lever, an extension on said hook member having one end readily accessible adjacent said free end of said multiplying lever and a pivotal connection between said hook member and said multiplying lever, said hook member being movable about said pivotal connection away from and towards said roller engaging means by means of said extension.

2. Weighting motions for drafting rollers used in preparatory and spinning machines comprising a hook member, means associated with said rollers for engaging said hook member, a multiplying lever pivotally supported at one end and with its free end accessible in the front of the machine, weighting means attached to said lever, an actuating lever integral with said hook member having one end readily accessible adjacent said free end of said multiplying lever, a pivotal connection between said hook member and said multiplying lever and spring means bearing between said actuating and multiplying lever, said hook member being movable about said pivotal connection away from said roller engaging means by the action of said spring on said actuating lever when the free end of said multiplying lever is lifted.

3. Weighting motions for drafting rollers used in preparatory and spinning machines comprising a hook member, means associated with said rollers for engaging said hook member, a hollow multiplying lever of U-section pivotally supported at one end and with its free end accessible in the front of the machine, weighting means pivotally attached to said lever adjacent said free end thereof, an actuating extension on said hook member housed within said multiplying lever and having its free end readily accessible adjacent said free end of said multiplying lever, a pivotal connection between said hook member and said multiplying lever and adjacent the pivotally supported end of said multiplying lever, a transverse abutment on said multiplying lever between said weighting means and said pivotally supported end thereof and a coiled spring housed within the multiplying lever and bearing with one end against said abutment and the other end engaging the said actuating extension, said hook member being movable by means of said actuating extension about said pivotal connection, in one direction automatically by means of said spring when said multiplying lever is lifted and manually in the other direction.

4. Weighting motions for drafting rollers used in preparatory and spinning machines comprising a hook member, means connected with said rollers for engaging said hook member, a multiplying lever pivotally supported at one end and with its free end formed with a curved extension and readily accessible in the front of the machine, weighting means attached to said lever adjacent said free end, a right-angled extension on said hook member freely housed within said multiplying lever and having one end readily accessible adjacent said free end of said multiplying lever, a pivotal connection between said hook member and said multiplying lever, said hook member being movable about said pivotal connection away from and towards said roller engaging means and an abutment on said multiplying lever to take the weight against a rigid support when said hook member is released from said roller engaging means.

J. NOGUERA.

REFERENCES CITED

The following references are of record in the file of this patent:

UNITED STATES PATENTS

| Number | Name | Date |
|---|---|---|
| 2,071,023 | Calvert | Feb. 16, 1937 |
| 2,139,016 | Harris | Dec. 6, 1938 |
| 2,239,102 | Jones et al. | Apr. 22, 1941 |

FOREIGN PATENTS

| Number | Country | Date |
|---|---|---|
| 213,009 | Great Britain | Mar. 24, 1924 |
| 1,494 | Great Britain | 1888 |